United States Patent
Yamagishi

(10) Patent No.: US 7,268,908 B2
(45) Date of Patent: Sep. 11, 2007

(54) IMAGE PROCESSING SYSTEM AND ITS CONTROL METHOD

(75) Inventor: Yoichi Yamagishi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/923,878

(22) Filed: Aug. 24, 2004

(65) Prior Publication Data

US 2005/0024676 A1 Feb. 3, 2005

Related U.S. Application Data

(62) Division of application No. 09/467,978, filed on Dec. 21, 1999, now Pat. No. 6,819,444.

(30) Foreign Application Priority Data

Dec. 28, 1998 (JP) ................................. 10-372240

(51) Int. Cl.
*G06K 15/00* (2006.01)
*G06F 15/00* (2006.01)

(52) U.S. Cl. ..................... 358/1.15; 358/448
(58) Field of Classification Search ............... 358/448, 358/402, 1.15, 1.16; 711/154, 156
See application file for complete search history.

(56) References Cited

U.S. PATENT DOCUMENTS

| | | | | |
|---|---|---|---|---|
| 4,774,524 | A * | 9/1988 | Warbus et al. ................ 346/44 |
| 5,889,930 | A * | 3/1999 | Fukudome ................... 358/1.9 |
| 5,935,262 | A * | 8/1999 | Barrett et al. ................ 714/46 |
| 6,097,499 | A | 8/2000 | Casey et al. ............... 358/1.16 |
| 6,148,066 | A | 11/2000 | Di Santo et al. ........ 379/93.19 |
| 6,334,161 | B1 | 12/2001 | Suzuki et al. ................. 710/29 |
| 6,384,928 | B2 | 5/2002 | Nagasawa et al. ......... 358/1.15 |
| 6,425,019 | B1 | 7/2002 | Tateyama et al. ............. 710/11 |
| 6,449,054 | B1 | 9/2002 | Cox et al. .................. 358/1.15 |
| 6,476,927 | B1 | 11/2002 | Schwarz, Jr. ............. 358/1.15 |
| 6,603,737 | B1 | 8/2003 | Fukunaga et al. .......... 370/229 |
| 6,665,082 | B1 * | 12/2003 | Takeoka et al. ........... 358/1.15 |
| 6,717,692 | B1 | 4/2004 | Yamagishi ................. 358/1.15 |
| 6,819,444 | B1 * | 11/2004 | Yamagishi ................. 358/1.15 |
| 2001/0013944 | A1 | 8/2001 | Nagasawa et al. ......... 358/1.14 |
| 2001/0042142 | A1 | 11/2001 | Fukunaga et al. ............. 710/11 |
| 2002/0062407 | A1 | 5/2002 | Tateyama et al. ............. 710/11 |
| 2003/0158979 | A1 | 8/2003 | Tateyama et al. ............. 710/33 |

FOREIGN PATENT DOCUMENTS

| | | |
|---|---|---|
| JP | 63-12017 | 1/1988 |
| JP | 8-036474 | 2/1996 |
| JP | 08-036474 | * 2/1996 |
| JP | 9-164730 | 6/1997 |
| JP | 10-285246 | 10/1998 |
| JP | 10/285322 | 10/1998 |

* cited by examiner

OTHER PUBLICATIONS

US 6,584,524, 06/2003, Fukunaga et al. (withdrawn)

*Primary Examiner*—Gabriel I. Garcia
(74) *Attorney, Agent, or Firm*—Fitzpatrick, Cella, Harper & Scinto

(57) ABSTRACT

A host computer is connected to a plurality of printers via an IEEE1394 bus. To make these printers print an identical image, the host computer assures a communication channel. The host computer then broadcasts print data to the printers to make them print images. In this case, the host computer starts transmission after it confirms that all the printers are ready to print and to receive print data. Upon receiving a busy response from any printer, the host computer pauses data transmission.

10 Claims, 12 Drawing Sheets

IMAGE PROCESSING SYSTEM AND ITS CONTROL METHOD

RELATED APPLICATION

This application is a division of application Ser. No. 09/467,978, filed on Dec. 21, 1999 now U.S. Pat. No. 6,819,444, the entire disclosure of which is incorporated herein by reference.

BACKGROUND OF THE INVENTION

The present invention relates to an image processing system which connects a plurality of image forming apparatuses and an image processing apparatus that supplies image data and, more particularly, to an image processing system which connects an image processing apparatus and image forming apparatus to each other via a high-speed serial communication with a mechanism for assuring a predetermined data transfer rate, and its control method.

In recent years, in order to implement high-speed data transfer, high-speed serial communications such as IEEE1394, USB (UNIVERSAL SERIAL BUS), and the like are used in place of conventional asynchronous communication means. USB, IEEE1394, or the like has a mechanism for assuring a given data transfer rate such as the isochronous transfer mode in IEEE1394. In the isochronous transfer mode, a required number of channels that can transfer data are assured at prescribed cycle time intervals, and data are transferred via the assured channels. In this manner, an image processing system that transfers image data from an image processing apparatus such as a computer or the like to an image forming apparatus while assuring a data transfer rate corresponding to the processing performance of the apparatus can be built.

Assume that image data is sent from a single computer to a plurality of image forming apparatuses connected to that computer via isochronous communications such as high-speed serial communications so as to control them to form images in such conventional image processing system. In this case, each image forming apparatus must comprise a reception image memory for reliably receiving data sent from the computer, and its cost increases accordingly. For example, when one of the plurality of image forming apparatuses is not ready to print, if the computer begins to send data, the image forming apparatus which is not ready to print must save received data. Hence, the conventional image forming apparatus must have a memory for that purpose.

SUMMARY OF THE INVENTION

The present invention has been made in consideration of the above prior art, and has as its object to provide an image processing system and its control method, in which a computer sends print data to respective image forming apparatuses after all the image forming apparatuses become ready to output, and stops sending of the print data when any of the image forming apparatuses fails to receive data, whereby each image forming apparatus can reliably receive image data without any memory for storing image data sent from the computer, an information processing apparatus, and an image forming system control method.

In order to achieve the above object, the present invention comprises the following arrangement.

That is, there is provided an image processing system comprising an image processing apparatus and a plurality of image forming apparatuses, which are connected via an isochronous transfer serial bus, wherein the image processing apparatus has image data distribution means for assuring a transfer channel and sending a data packet, and paper feed end message reception means, each of the plurality of image forming apparatuses has image data reception means, image forming means, and paper feed end message means, and sends a paper feed end message of an image forming paper sheet to the image processing apparatus, the image processing apparatus starts distribution of an image data packet onto the isochronous transfer serial bus after the apparatus receives the paper feed end messages from all of the plurality of image forming apparatuses, and the plurality of image forming apparatuses receive the distributed image packet and form images.

Or there is provided a method of controlling an image processing system comprising an image processing apparatus and a plurality of image forming apparatuses, which are connected via an isochronous transfer serial bus, wherein the image processing apparatus has image data distribution means for assuring a transfer channel and sending a data packet, and paper feed end message reception means, each of the plurality of image forming apparatuses has image data reception means, image forming means, and paper feed end message means, and sends a paper feed end message of an image forming paper sheet to the image processing apparatus, the image processing apparatus starts distribution of an image data packet onto the isochronous transfer serial bus after the apparatus receives the paper feed end messages from all of the plurality of image forming apparatuses, and the plurality of image forming apparatuses receive the distributed image packet and form images.

Or there is provided an image forming system comprising an image processing apparatus and image forming apparatus, which are connected via a bus which can communicate using both isochronous and asynchronous communication schemes, wherein the image processing apparatus sends print data to the image forming apparatus using the isochronous communication scheme, the image forming apparatus outputs an image on the basis of the print data sent from the image processing apparatus, and when the image forming apparatus must stop the output of the image, the image forming apparatus sends a message indicating that to the image processing apparatus using the asynchronous communication scheme, and the image processing apparatus stops transmission of the print data upon reception of the message indicating that the output of the image is stopped, and sends an output stop command to the image forming apparatus using the asynchronous communication scheme.

Preferably, the image processing apparatus confirms if the image-forming apparatus has already fed a paper sheet, prior to beginning of transmission of print data to the image forming apparatus.

Preferably, a plurality of image forming apparatuses are connected to the image processing apparatus, the image processing apparatus broadcasts identical print data to the plurality of image forming apparatuses, and when the image processing apparatus receives the message indicating that the output of the image is stopped from at least one of the plurality of image forming apparatuses, the image processing apparatus stops transmission of print data to all the image forming apparatuses, and sends an output stop command to all the image forming apparatuses using the asynchronous communication scheme.

Preferably, when the image processing apparatus receives the message indicating that the output of the image is stopped, the image processing apparatus pauses transmission of print data for a predetermined period of time before the image processing apparatus stops transmission of print data, and when the message indicating that the output of the image is stopped is canceled within the predetermined period of time, the image processing apparatus restarts transmission of print data.

The present invention comprises the following arrangement.

That is, there is provided a method of controlling an image forming system comprising an image processing apparatus and image forming apparatus, which are connected via a bus which can communicate using both isochronous and asynchronous communication schemes, wherein the image processing apparatus sends print data to the image forming apparatus using the isochronous communication scheme, the image forming apparatus outputs an image on the basis of the print data sent from the image processing apparatus, and when the image forming apparatus must stop the output of the image, the image forming apparatus sends a message indicating that to the image processing apparatus using the asynchronous communication scheme, and the image processing apparatus stops transmission of the print data upon reception of the message indicating that the output of the image is stopped, and sends an output stop command to the image forming apparatus using the asynchronous communication scheme.

Preferably, the image processing apparatus receives messages each indicating that the image forming apparatus is ready to form an image from all the image forming apparatuses, and then starts transmission of print data.

The present invention comprises the following arrangement.

That is, there is provided an information processing apparatus connected to a plurality of image forming apparatuses, comprising:

transmission means for broadcasting print data to the plurality of image forming apparatuses;

reception means for receiving status data from each of the plurality of image forming apparatuses; and transmission control means for controlling transmission of print data by the transmission means to the image forming apparatuses, wherein the transmission control means controls the transmission means to start broadcast of print data upon receiving from all the image forming apparatuses status data each indicating that the image forming apparatus is ready to receive and output.

Preferably, the transmission control means pauses print data broadcast upon receiving status data indicating that print data cannot be received from some image forming apparatus during broadcast of print data to the image forming apparatuses, and restarts print data broadcast upon receiving within a predetermined period of time a message indicating that the image forming apparatus is ready to receive print data from the image forming apparatus.

Preferably, the transmission control means determines a state in which each image forming apparatus is ready to print and has completed paper feed as a state in which that image forming apparatus is ready to receive and output.

Preferably, the transmission means sends print data via a communication in an isochronous mode, and the reception means receives status data via a communication in an asynchronous mode.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

First Embodiment

Figure 1:
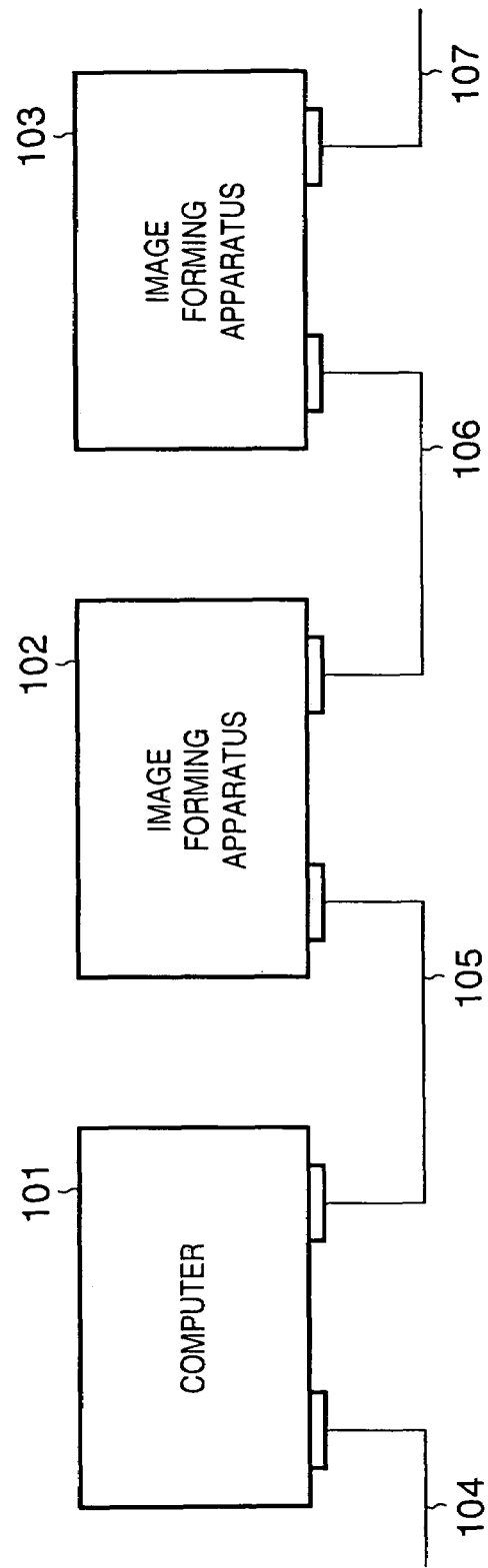
FIG. 1 is a system block diagram.

FIG. 1 shows the overall arrangement of an image processing system built by connecting a computer serving as an image processing apparatus, and image forming apparatuses such as a printer and the like.

Normally, a computer 101 which is used by the user is connected to an image forming apparatus 102 via a high-speed serial communication line 105, and also to an image forming apparatus 103 via a high-speed serial communication line 106. The computer 101 is connected to another device (not shown) via a high-speed serial communication line 104, and the image forming apparatus 103 is connected to still another device (not shown) via a high-speed serial communication line 107, as needed.

The image forming apparatuses 102 and 103 have a print function of forming and outputting an image on the basis of image data received from an image processing apparatus such as a computer or the like. Upon printing a document or image created by the computer 101, the image forming apparatuses 102 and 103 respectively receive image forming data from the computer 101 via the high-speed serial communication line 105 and via the high-speed serial communication lines 105 and 106, and print data after a required image process.

The high-speed serial communication lines 104, 105, 106, and 107 are those for making communications by a communication scheme with a mechanism for assuring a data transfer rate such as USB, the isochronous transfer mode of IEEE1394, and the like, and normally have a high-speed serial bus configuration.

<Arrangement of Computer>

Figure 2:
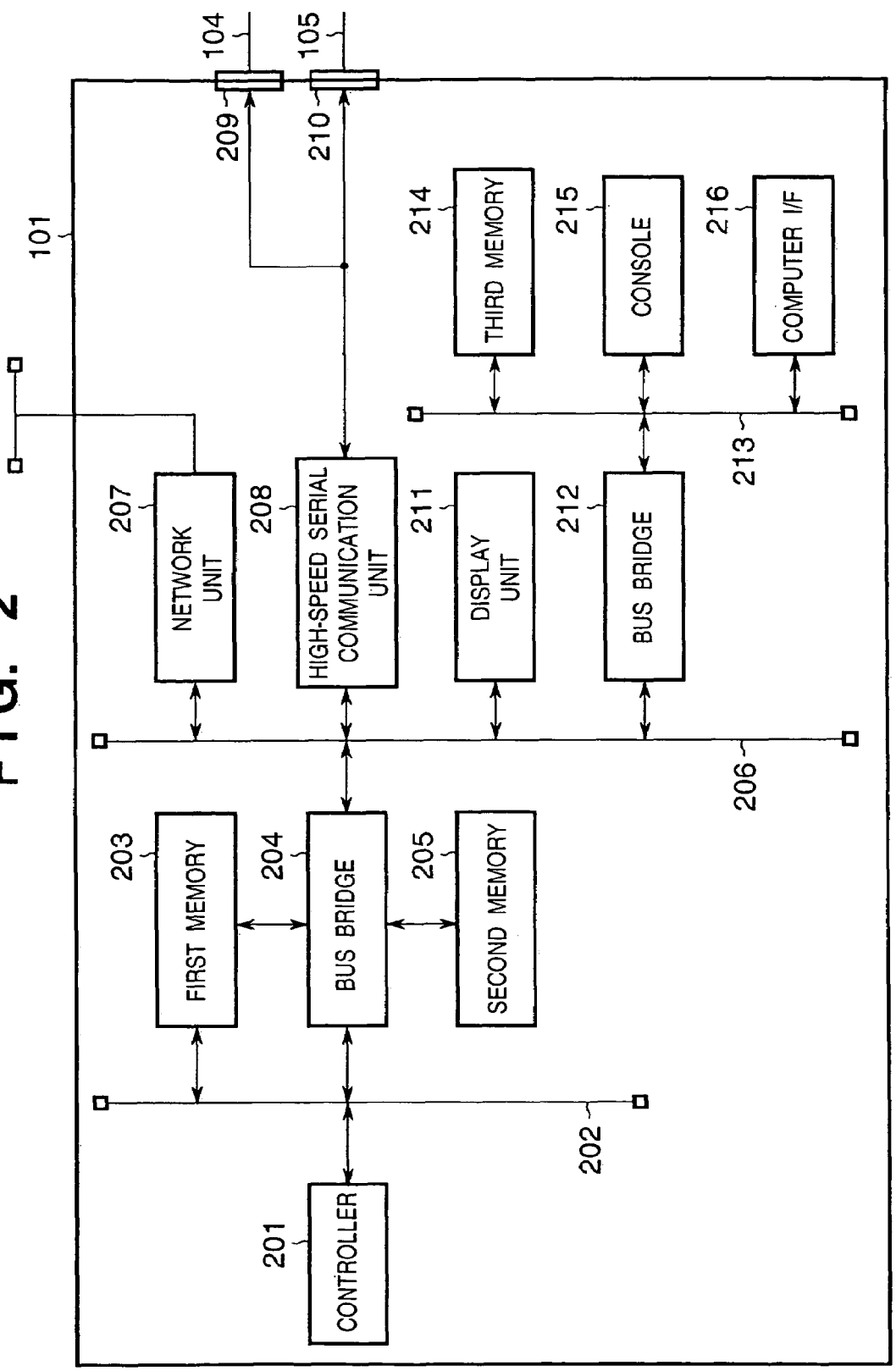
FIG. 2 is a block diagram showing the arrangement of a computer.

The aforementioned computer 101 will be explained below using FIG. 2.

A controller 201 controls the entire computer. In this case, the controller 201 comprises a CPU and the like.

A CPU bus 202 connects the controller 201, a first memory 203, and a bus bridge 204, and transfers data processed by the controller 201 at high speed.

The first memory 203 is used as a cache memory upon operation of the controller 201. The first memory 203 can be accessed by the controller 201 at high speed, and temporarily stores data used in arithmetic operations of the controller 201. As the first memory, a high-speed SRAM or the like is normally used.

The bus bridge 204 bridges between the CPU bus 202 and a high-speed bus 206 (to be described later), and absorbs any processing speed difference between the two buses. With the intervention of this bus bridge 204, the controller 201 that operates at high speed can exchange data with individual units connected to the high-speed bus having lower speed than the CPU bus 202. The bus bridge 204 also has a memory controller function. That is, the bus bridge 204 reads out data, which was temporarily written at high speed in the first memory 203 by the controller 201, at a predetermined timing, and writes the readout data in a second memory 205. Also, the bus bridge 204 reads out data from the second memory 205 in response to a request from the controller 201, and writes the readout data in the first memory 203. The bus bridge 204 performs a series of management operations of the cache memory.

The second memory 205 is a main memory used by the controller 201 upon executing various applications and the like. As the second memory, a DRAM or the like is normally used.

The high-speed bus 206 connects the bus bridge 204, a network unit 207, a high-speed serial communication unit 208, a display unit 211, and a bus bridge 212. The high-speed bus 206 transfers data processed by the controller 201 to individual peripheral units, and transfers (DMA-transfers) data at high speed among the peripheral units. As the high-speed bus 206, a PCI bus or the like is normally used.

The network unit 207 is an interface for connecting the computer 101 to a network, and exchanges data with the network. As the network connected, Ethernet, token-ring, and the like may be used.

The high-speed serial communication unit 208 has a mechanism such as the isochronous transfer mode for assuring a data transfer rate, and can exchange a large quantity of image data at high speed within a predetermined period of time. In the isochronous transfer mode, a channel, the data transfer cycle of which is guaranteed, is assured, and data packets are broadcasted via this channel. The data transfer rate can be increased by increasing the number of channels to be assured.

The high-speed serial communication unit 208 also has a mechanism such as the asynchronous transfer mode for performing one-to-one asynchronous transfer between the sender and receiver sides, and can make a predetermined communication with the image forming apparatuses 102 and 103 as needed. Data is transferred using packets.

The high-speed serial communication unit 208 uses IEEE1394 in this embodiment.

High-speed serial communication connectors 209 and 210 connect the computer 101 and the image forming apparatus via the serial communication line 105.

The display unit 211 comprises a liquid crystal display device, loudspeaker, and the like. The display unit 211 produces characters, images, sound and the like in accordance with program execution of the controller 201.

The bus bridge 212 bridges between the high-speed bus 206 and a low-speed bus 213, and absorbs any processing speed difference between these buses. With the intervention of this bus bridge 212, the individual peripheral units connected to the high-speed bus can exchange data with peripheral units which are connected to the low-speed bus 213 and operate at low speed.

The low-speed bus 213 connects the bus bridge 212, a third memory 214, a console 215, and a computer interface 216, has a transfer rate lower than that of the high-speed bus 206, and is used to connect units having relatively low processing performance. Originally, an ISA bus or the like is used as the low-speed bus 213.

The third memory 214 stores a plurality of application programs and the like to be executed by the controller 201. The third memory 214 usually comprises a large-capacity hard disk, and is managed by the aforementioned controller 201.

The console 215 is comprised of a keyboard, microphone, and the like. The operator inputs various setups required for operating the computer 101 and various operation instructions to the controller 201 via the console 215.

The low-speed computer interface 216 connects the computer 101 and peripheral devices. In general, RS-232C that performs serial communications, Centronics interface that performs parallel communications, or the like, is used.

<Arrangement of Image Forming Apparatus>

Figure 3:
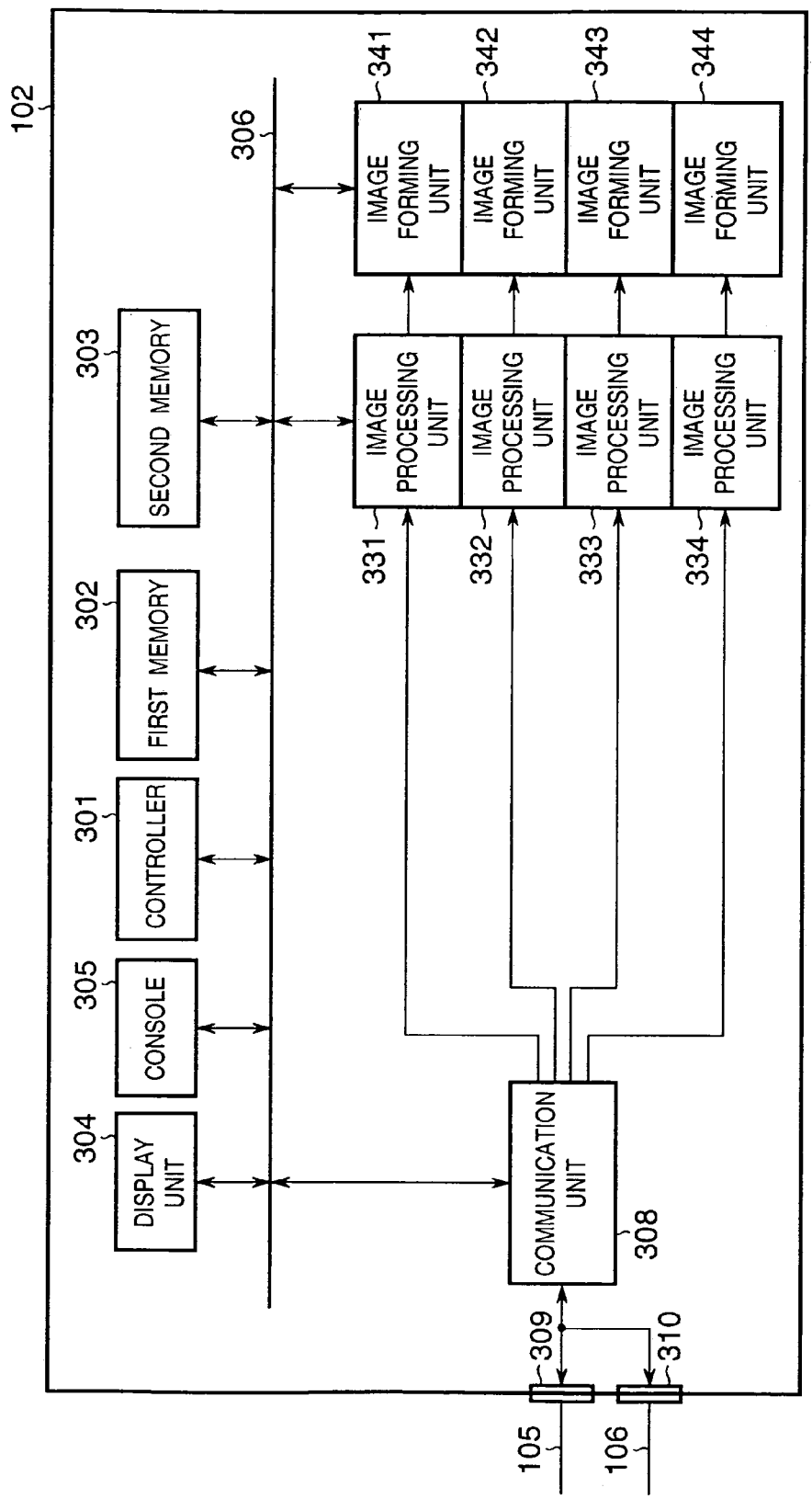
FIG. 3 is a block diagram showing the arrangement of an image forming apparatus.
Figure 4:
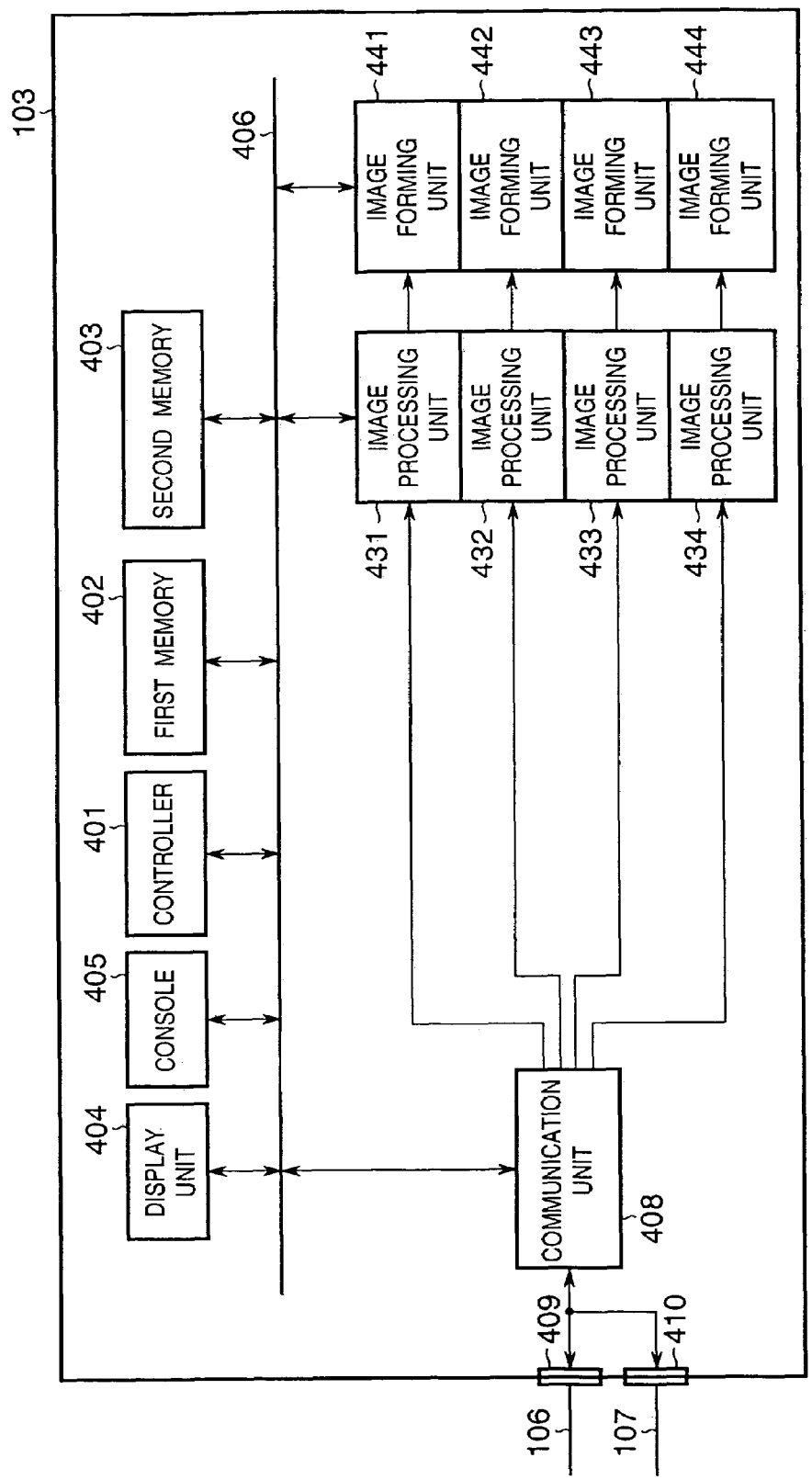
FIG. 4 is a block diagram showing the arrangement of an image forming apparatus.

The above-mentioned image forming apparatuses 102 and 103 will be explained below using FIGS. 3 and 4.

The image forming apparatus 102 will be explained first using FIG. 3. The image forming apparatus 102 is controlled by a real-time OS.

A controller 301 comprises a CPU or the like that controls the entire image forming apparatus, and implements the real-time OS by executing an OS program.

A first memory 302 is a work memory used upon operating the controller 301. The first memory can be accessed by the controller 301 at high speed.

A second memory 303 stores a plurality of applications and the like executed by the controller 301. The second memory normally comprises a large-capacity hard disk, which is managed by the controller 301.

A display unit 304 includes a liquid crystal display, and a console 305 has a touch panel device adhered on the liquid crystal display, and a plurality of hardware keys. A signal input by the touch panel or one hardware key is sent to the controller 301 via a CPU bus 306. The display unit 304 displays image data read out and sent from the first memory 302 and/or the second memory 303. The liquid crystal display of the display unit 304 displays functions of the image forming unit 102, image data, and the like.

The console 305 may also comprise other input means such as a digitizer and pen recognition unit for pen input, a microphone and voice recognition unit for voice input, an image sensing unit and image recognition unit for image input, and the like.

The CPU bus 306 connects the respective function units such as the controller 301, first and second memories 302 and 303, display unit 304, console 305, and the like. The CPU bus 306 transfers data processed by the controller 301 to the individual function units, and transfers (DMA-transfers) data at high speed among the respective function units.

A high-speed serial communication unit 308 has a mechanism such as the isochronous transfer mode for assuring a data transfer rate, and can exchange a large quantity of image data at high speed within a predetermined period of time. In the isochronous transfer mode, a channel, the data transfer cycle of which is guaranteed, is assured, and data packets are broadcasted via this channel. The data transfer rate can be increased by increasing the number of channels to be assured.

The high-speed serial communication unit 308 also has a mechanism such as the asynchronous transfer mode for performing one-to-one asynchronous transfer, and can communicate with the computer 101 as needed. Data is transferred using packets. The high-speed serial communication unit 308 comprises IEEE1394 in this embodiment.

High-speed serial communication connectors 309 and 310 connect the image forming apparatus 102 to the computer 101 via the high-speed serial communication line 105, and to the image forming apparatus 103 via the high-speed serial communication line 106.

Image processing units 331, 332, 333, and 334 execute various image processes such as smoothing, an edge process, color correction, and the like for corresponding color image data input from the high-speed serial communication unit 308 in accordance with a processing command from the controller 301.

Image forming units 341, 342, 343, and 344 form visible images on a recording sheet in units of colors on the basis of the received image data. In this embodiment, electrophotography is used as the image forming scheme. In electrophotography, an electrostatic latent image is formed on a photosensitive drum using a laser or LED beam and is developed by toner to form a toner image, and the toner image is transferred and thermally fixed onto a recording sheet, thus forming an image.

The image forming units 341 to 344 modulate laser or LED beams using a video signal, thus forming images. In such scheme, images are formed in units of pages, and once image formation is started, it can be interrupted only in units of pages. If image formation is interrupted in the middle of one page, image quality deteriorates considerably. For this reason, in this scheme, in order to prevent printing from being interrupted in the middle of a page due to the absence of print data to be printed, a memory (page memory) for holding image data to be supplied to each image forming unit is prepared. In this embodiment, the page memory is included in each image forming unit. The page memory preferably has a memory size corresponding to one page, but the memory size may be smaller than one page if double-buffering is adopted. Even when a page memory for one page is assured, double-buffering is preferably adopted to prevent printing from being interrupted.

Double-buffering is the following memory management scheme. That is, the page memory is divided into two banks. While image data is being written in one bank, image data is read out from the other bank parallel to the write, and the readout image data is used in image formation as a video signal. Using this scheme, printing need not be interrupted upon writing image data in the page memory.

The image forming apparatus 103 will be described below using FIG. 4.

A controller 401 comprises a CPU or the like that controls the entire image forming apparatus, and implements the real-time OS by executing an OS program.

A first memory 402 is a work memory used upon operating the controller 401. The first memory can be accessed by the controller 401 at high speed.

A second memory 403 stores a plurality of applications executed by the controller 401. The second memory normally comprises a large-capacity hard disk, which is managed by the controller 401.

A display unit 404 includes a liquid crystal display, and a console 405 has a touch panel device adhered on the liquid crystal display, and a plurality of hardware keys. A signal input by the touch panel or one hardware key is sent to the controller 401 via a CPU bus 406. The display unit 404 displays image data read out and sent from the first memory 402 and/or the second memory 403. The liquid crystal display of the display unit 404 displays functions of the image forming unit 103, image data, and the like.

The console 405 may also comprise other input means such as a digitizer and pen recognition unit for pen input, a microphone and voice recognition unit for voice input, an image sensing unit and image recognition unit for image input, and the like.

The CPU bus 406 connects the respective function units such as the controller 401, first and second memories 402 and 403, display unit 404, console 405, and the like. The CPU bus 406 transfers data processed by the controller 401 to the individual function units, and transfers (DMA-transfers) data at high speed among the respective function units.

A high-speed serial communication unit 408 has a mechanism such as the isochronous transfer mode for assuring a data transfer rate, and can exchange a large quantity of image data at high speed within a predetermined period of time. In the isochronous transfer mode, a channel, the data transfer cycle of which is guaranteed, is assured, and data packets are broadcasted via this channel. The data transfer rate can be increased by increasing the number of channels to be assured.

The high-speed serial communication unit 408 also has a mechanism such as the asynchronous transfer mode for performing one-to-one asynchronous transfer, and can communicate with the computer 101 as needed. Data is transferred using packets. The high-speed serial communication unit 408 comprises IEEE1394 in this embodiment.

High-speed serial communication connectors 409 and 410 connect the image forming apparatus 103 to the image forming apparatus 102 via the high-speed serial communication line 106.

Image processing units 431, 432, 433, and 434 execute various image processes such as smoothing, an edge process, color correction, and the like for corresponding color image data input from the high-speed serial communication unit 408 in accordance with a processing command from the controller 401.

Image forming units 441, 442, 443, and 444 form visible images on a recording sheet in units of colors on the basis of the received image data. In this embodiment, electrophotography is used as the image forming scheme.

Figure 12:
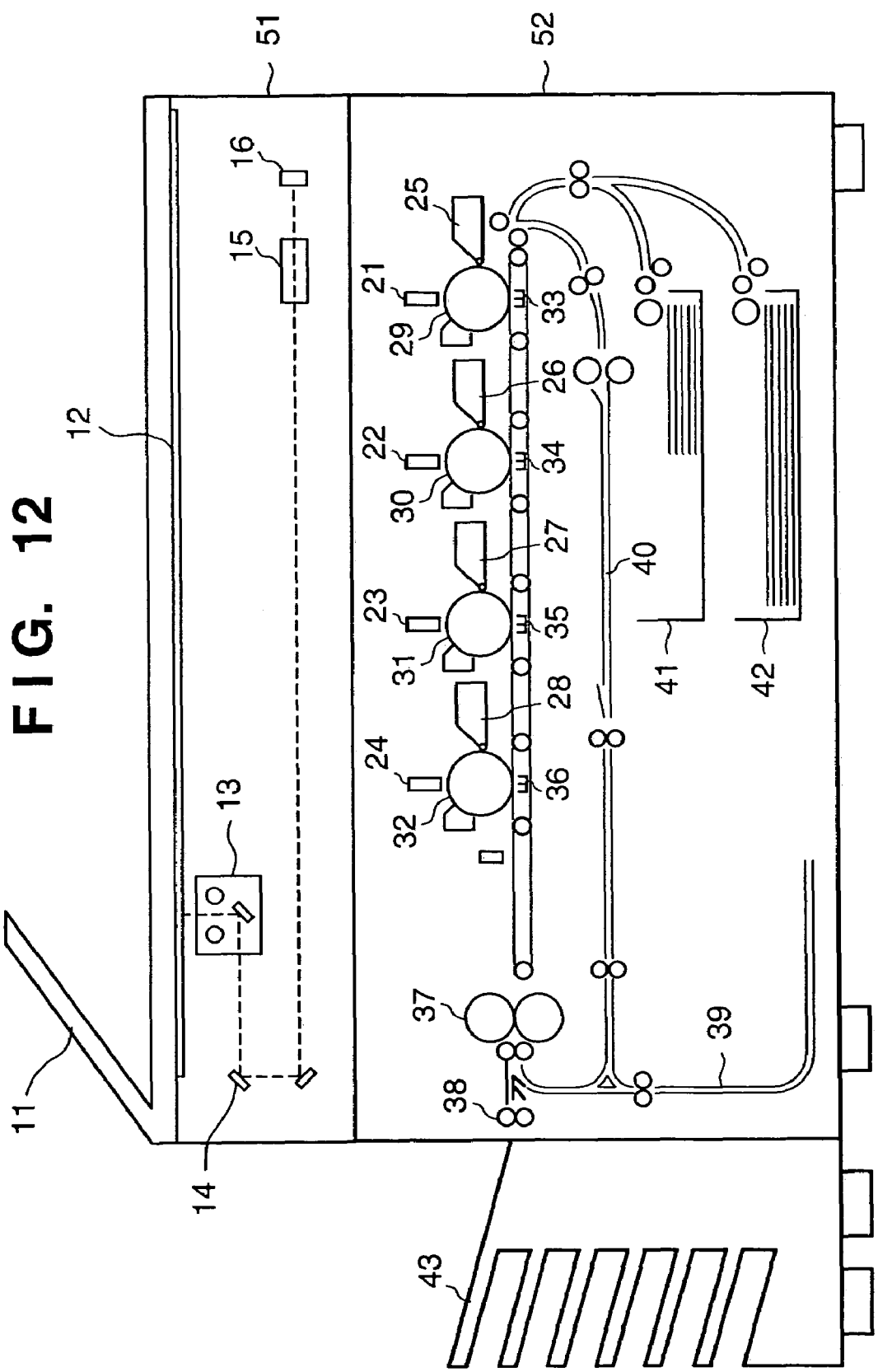
FIG. 12 is an explanatory view showing the structure of the mechanism of the image forming apparatus.

The mechanism of the image forming apparatus will be explained below using FIG. 12.

An original feeder 11 of a scanner unit 51 feeds originals one by one from the last page onto original platen glass 12, and exhausts an original on the original platen glass 12 upon completion of scanning of an original image.

When an original is conveyed onto the original platen glass 12, a lamp equipped in a scanner 13 is turned on, and the scanner 13 begins to move to scan the original by exposure.

At this time, light reflected by the original is guided to an image sensing element 16 via a plurality of mirrors 14 and a lens 15. In this manner, the scanned original image is captured by the image sensing element 16.

Image data output from the image sensing element 16 undergoes a predetermined process, and is then transferred to a scanner I/F (not shown). The scanner I/F comprises a video I/F or high-speed serial communication I/F.

In a printer unit 52, light-emitting sections 21, 22, 23, and 24 emit laser or LED beams in accordance with image data of the respective colors input from a printer I/F (not shown). The printer I/F comprises a video I/F or high-speed serial communication I/F.

The laser or LED beams strike photosensitive drums 29, 30, 31, and 32, and latent images are formed on the photosensitive drums 29, 30, 31, and 32 in accordance with the laser or LED beams.

Developers 25, 26, 27, and 28 respectively apply toners to the latent image portions on the photosensitive drums 29, 30, 31, and 32 to form toner images.

A recording sheet is fed from one of paper cassettes 41 and 42 at a timing synchronous with the beginning of emission of the laser or LED beam, and is conveyed to transfer sections .33, 34, 35, and 36 in turn, thus transferring the toner images formed on the photosensitive drums 29, 30, 31, and 32 onto the recording sheet.

The recording sheet on which the toner images are transferred is conveyed to a fixing section 37, and the toner images are fixed on the recording sheet by heat and pressure of the fixing section 37.

The recording sheet that has left the fixing section 37 is exhausted by exhaust rollers 38. In this case, a sorter 43 stores exhausted recording sheets in individual bins to sort them.

In case of double-sided recording, the recording sheet that has left the fixing section 37 is temporarily conveyed toward a convey switch 39, and the direction of rotation of paper feed rollers is reversed to guide the recording-sheet from the convey switch 39 onto a re-feed convey path 40. In case of multiple recording, the recording sheet is guided onto the re-feed convey path 40 before it reaches the exhaust rollers 38. The recording sheet guided onto the re-feed convey path 40 is fed at the aforementioned timing, and is conveyed to the transfer sections 33, 34, 35, and 36 in turn.

Upon outputting image data received from a computer, the scanner unit 51 is not used, and only the printer unit 52 is used. In this case, image data input from a host computer via a high-speed serial communication connector is input to the printer unit 52 via the printer I/F (not shown). The printer unit 52 renders that data into dot image as needed, and forms an image by modulating laser or LED beams in accordance with the image data.

<Operation of Image Forming System>The operation of the image forming system shown in FIG. 1 will be described below with reference to FIGS. 5, 6, 7, 8, 9, 10, and 11.

Figure 5:
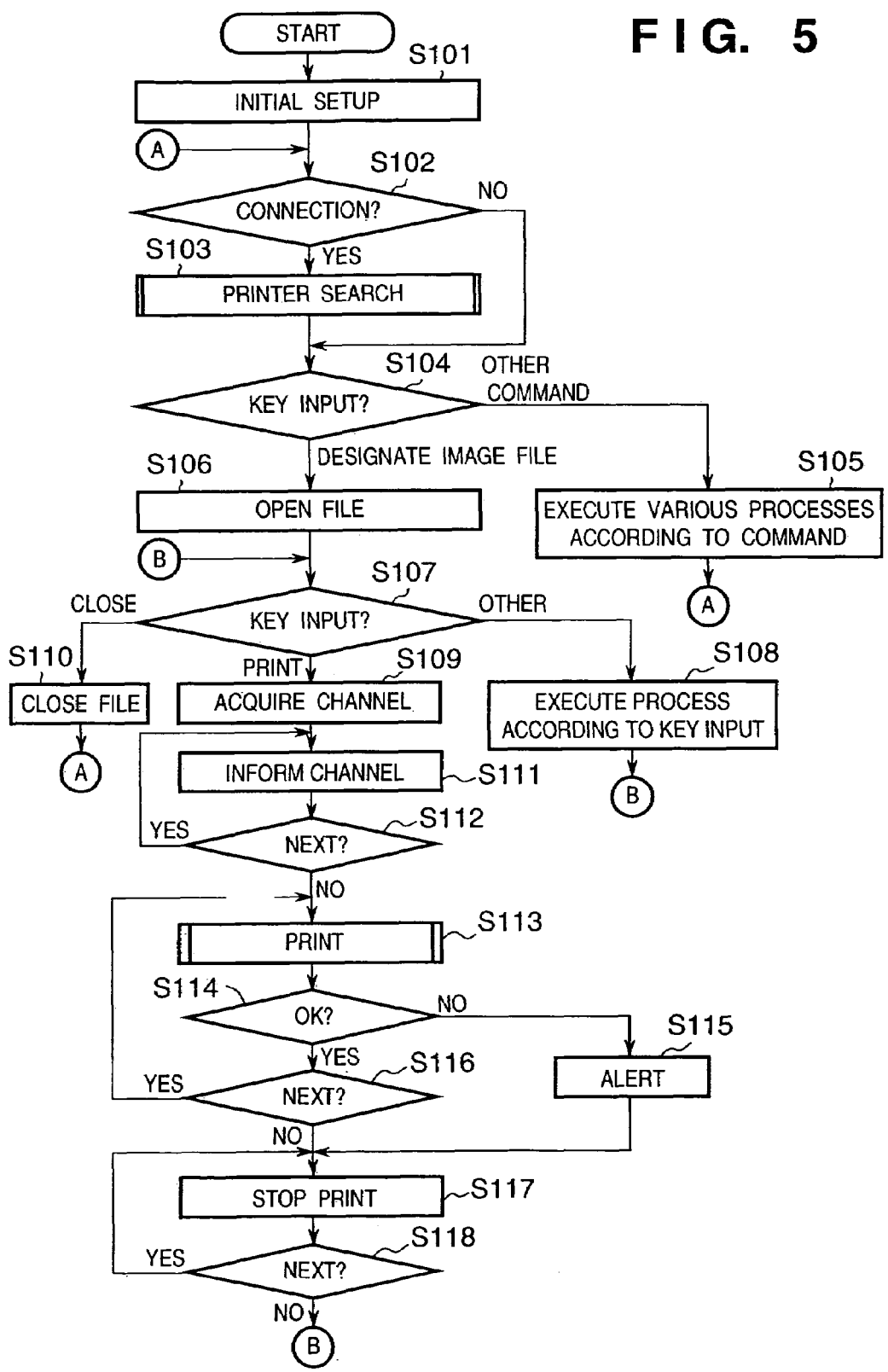
FIG. 5 is a flow chart showing the main routine of the computer.

FIG. 5 is a flow chart showing the main routine of the computer 101. This sequence is implemented when the controller (CPU) 201 of the computer 101 executes a program stored in the first or second memory 203 or 205.

<Operation of Computer>

When the power supply of the computer 101 is turned on, the controller 201 initializes flags, registers, control variables, and the like, and executes a control program such as an operating system or the like stored in a given area of the second memory 205 after it loads the program onto the first memory 203 in units of predetermined sizes. The controller 201 then initializes the respective units of the computer 101 (S101).

The controller 201 checks if a new apparatus as well as the computer 101 itself is connected to the high-speed serial communication lines 104, 105, 106, and 107 (S102). If a new apparatus is connected, the controller 201 executes a printer search process (S103). The printer search process is performed to recognize a printer connected to the computer 101. The printer search process (S103) will be explained in detail later with reference to FIG. 6. In the arrangement shown in FIG. 1, the image forming apparatuses 102 and 103 are found by the printer search process.

The controller 201 checks if the input at a key, touch panel, digitizer, or the like of the console 215 is a command input for designating and opening an image file to be printed, or a command input for executing other processes (S104). If a command input for other processes is detected, the controller 201 executes various processes according to the input command (S105), and the flow then returns to step S102 upon completion of the processes.

On the other hand, if the command for designating and opening the image file to be printed is input, the controller 201 opens the designated image file, and loads it onto the second memory 205 from the third memory 213, via the network unit 207, or via the high-speed serial communication unit 208 (S106).

The controller 201 checks if the input at the console 215 is a command input for printing the opened image file, a command input for closing the opened image file, or a command input for executing other processes (S107). If a command input for other processes is detected, the controller 201 executes various processes according to the input command (S108), and the flow then returns to step S107 upon completion of the processes.

If the input at the console 215 is a command input for closing the opened image file, the controller 201 closes the image file loaded on the second memory 205 (S110), and releases an area of the second memory 205, which has become unnecessary. The flow then returns to step S102. If the contents of the image file have changed and must be saved in step S110, the controller saves the image file in the third memory 213, via the network unit 207, or via the high-speed serial communication unit 208, and then closes it.

If the input at the console 215 is a command for printing the opened image file, the controller 201 acquires a required number of channels, the data transfer rate per channel of which is guaranteed, to execute isochronous transfer (to be referred to as Iso transfer mode hereinafter) on the high-speed serial communication line (S109). The controller 201 informs the image forming apparatuses 102 and 103 detected in the printer search process step S103 of a number or numbers that identify one or a plurality of acquired channels using one-to-one asynchronous transfer such as the asynchronous transfer mode (to be referred to as Async transfer mode hereinafter) via the high-speed serial communication unit 208, high-speed serial communication connector 210, and high-speed serial communication line 105 (S111, S112).

Subsequently, the controller 201 transfers image data to the image forming apparatus 102 using one or a plurality of channels that it has informed the image forming apparatus 102, and makes the image forming apparatus 102 execute a print process for printing the image data (S113). The print process (S113) will be described in detail later using FIG. 7.

The controller 201 checks in step S114 if any problem is found in the print process. If any problem is found, the controller 201 produces a predetermined alert by means of an image, voice, text, or the like using the display unit 211 (S115), and sends a print stop command to the image forming apparatuses 102 and 103 to stop print operation (S117, S118). After the controller 201 outputs the print stop command, the flow returns to step S107.

If no problem is found in the print process in step S113, the controller 201 checks if the next print process is to be successively executed (S116). If the next print process is to be executed, the flow returns to step S113 to repeat a series of operations; otherwise, the controller 201 sends a print stop command to all the image forming apparatuses connected (the image forming apparatuses 102 and 103 in this case) to stop print operation (S117, 118). After the controller 201 outputs the print stop command, the flow returns to step S107.

With the aforementioned sequence, upon receiving a print halt message due to errors such as a failure, out-of-paper, or the like, the computer 101 sends a print stop command to all the printers to which it is sending print data. In this manner, the printer need not receive only data while its output halts. For this reason, even when the image forming apparatus cannot output data received from the computer 101, it need not proceed to receive data to be stored and, hence, no memory for storing received data is required.

Figure 6:
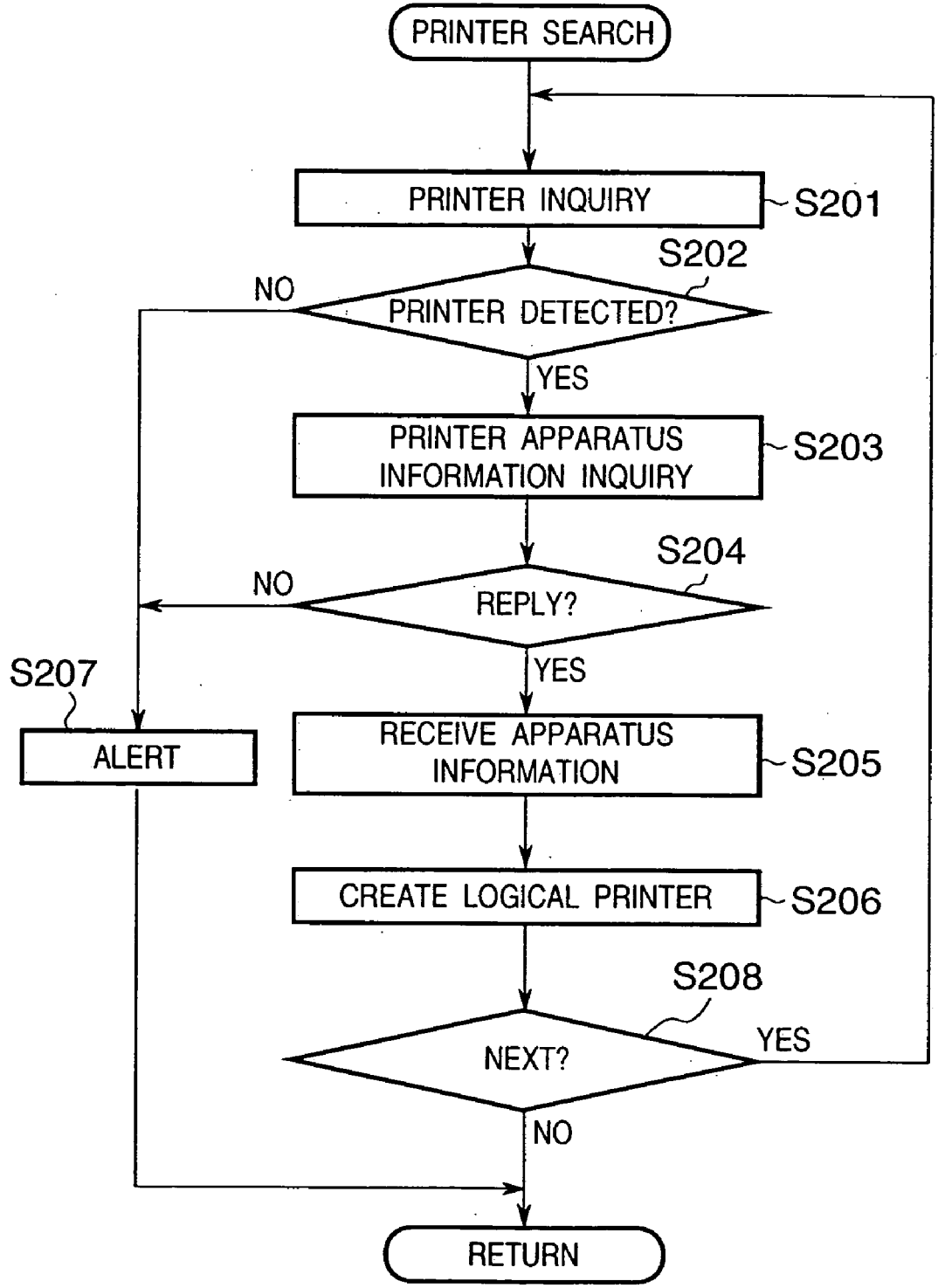
FIG. 6 is a flow chart showing the printer search routine of the computer.

FIG. 6 is a flow chart showing the printer search process in step S103 in FIG. 5 in detail.

The controller 201 inquires using the high-speed serial communication unit 208 if apparatuses connected to the high-speed serial communication lines 104, 105, 106, and 107 are image forming apparatuses such as printers capable of printing transferred image data (S201).

The controller 201 checks in step S202 if target image forming apparatuses are found. If such image forming apparatuses are found, the controller 201 inquires of the image forming apparatuses as to printer apparatus information (S203). In this embodiment, the image forming apparatuses 102 and 103 are present on the high-speed serial communication lines 104, 105, 106, and 107.

The controller 201 checks in step S204 if a response is sent back in response to the apparatus information inquiry. If printer apparatus information is sent back from the image forming apparatus 102 or 103, the controller 201 saves the received apparatus information in a given area of the second memory 205 (S205).

The controller 201 creates a logical printer corresponding to the image forming apparatus 102 or 103, which is used in the operating system to transfer and print image data (S206). The logical printer is a set of various kinds of information that pertain to the printer required for the operating system to use the printer.

The controller 201 checks in step S208 if it has searched all the apparatuses connected on the high-speed serial communication lines 104, 105, 106, and 107. If NO in step S208, the flow returns to step S201, and the controller 201 repeats a series of printer search processes until it searches all the apparatuses.

Upon completion of the search process of all the apparatuses connected on the high-speed serial communication lines 104, 105, 106, and 107, the controller 201 ends the printer search process routine (S103).

If no target printer such as an image forming apparatus or the like is present on the high-speed serial communication lines 104, 105, 106, and 107, or if no printer apparatus information is sent back, the controller 201 produces a predetermined alert by means of an image, voice, text, or the like using the display unit 211 (S207), and then ends the printer search process routine (S103).

Figure 7:
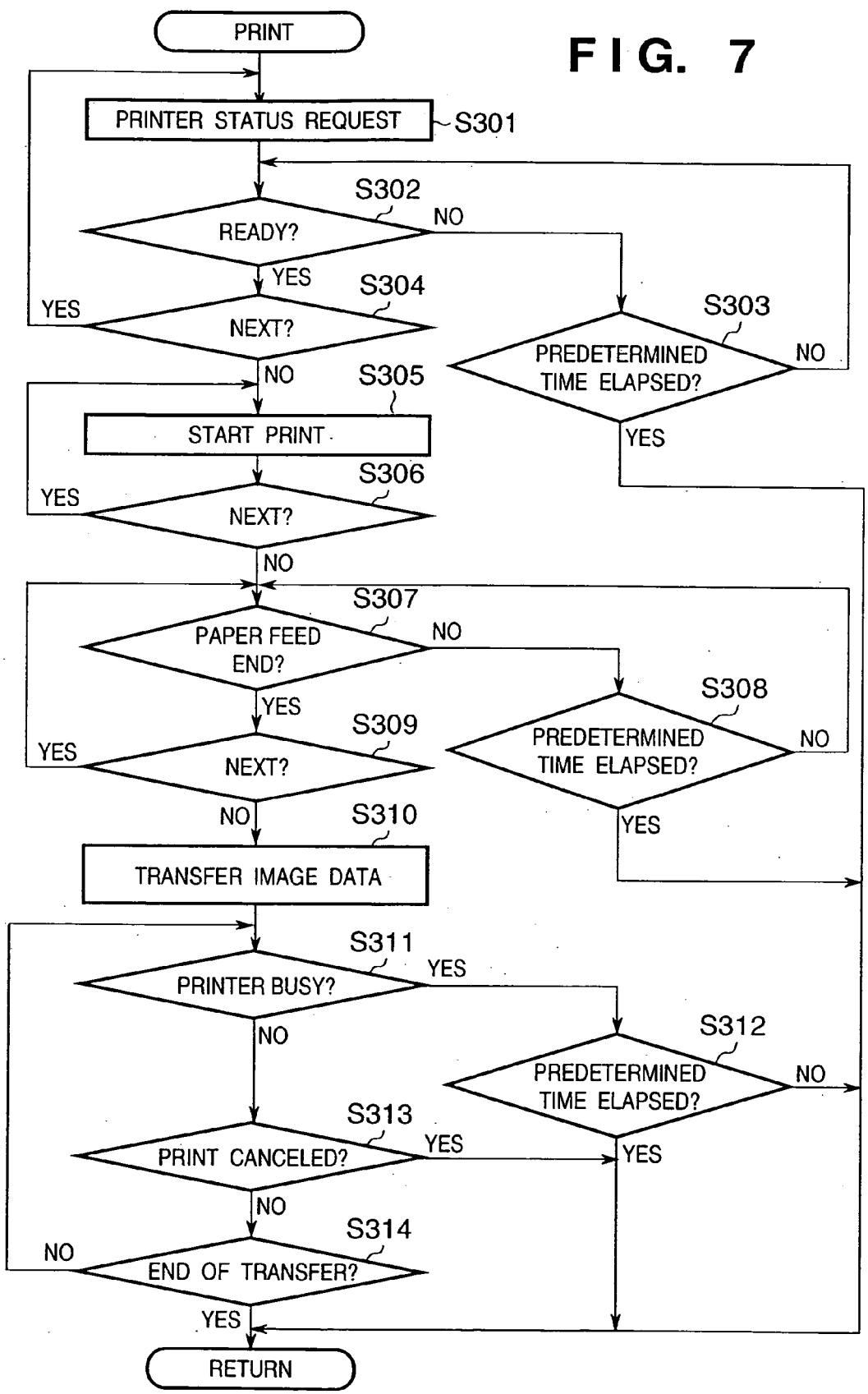
FIG. 7 is a flow chart showing the print routine of the computer.

FIG. 7 is a flow chart showing the print process in step S113 in FIG. 5 in detail.

The controller 201 requests, using the high-speed serial communication unit 208, the first target image forming apparatus such as a printer or the like (e.g., the image forming apparatus 102) to send printer status using Async transfer mode via the high-speed serial communication lines 104, 105, 106, and 107 (S301).

The controller 201 checks in step S302 if the image forming apparatus 102 sends back READY status indicating completion of preparation. If no READY status is sent back, the controller 201 checks in step S303 if a predetermined time has elapsed from the print status request. If a READY response is obtained, the controller 201 checks in step S304 if a printer to which the printer status request is to be sent still remains. In these steps, the controller 201 checks if READY responses are obtained from all the printers to be used in the print process within the predetermined period of time. If a printer to which the printer status request is to be sent still remains, the controller 201 executes the processes in steps S301 to S303 to the next printer (e.g., the image forming apparatus. 103). If it is determined in step S303 that no READY status is sent back within the predetermined period of time, the controller 201 ends the print process (step S113).

If READY status is sent back from all the target printers, the controller 201 sequentially sends a print start command to all the printers to be used in the print process (e.g., the image forming apparatuses 102 and 103) using Async transfer mode (S305, S306).

The controller 201 checks in steps S307, S308, and S309 if paper feed end messages have been received from all the printers to be used in the print process (e.g., the image forming apparatuses 102 and 103) within a predetermined period of time using Async transfer mode.

Upon receiving the paper feed end messages from all the printers to be used in the print process, the controller 201 begins to transfer image data in Iso transfer mode to all the printers to be used in the print process (e.g., the image forming apparatuses 102 and 103) using one or a plurality of channels acquired in step S109 so as to implement data transfer with the guaranteed data transfer cycle (S310).

In the sequence in steps S301 to S309, it is guaranteed that all the image forming apparatuses are ready to receive data from the computer and to output the received data.

The controller 201 monitors in step S311 if a printer busy message has arrived from the image forming apparatus 102 or 103 using Async transfer mode during image data transfer using Iso transfer mode. If such message has arrived, the controller 201 checks if the busy period falls within a predetermined period of time that does not pose any problem when a printer other than that which has issued the busy message receives image data (S312). If the busy period falls within the predetermined period of time, the controller 201 pauses image data transfer in Iso transfer mode during the busy period. If the busy state is canceled within the predetermined period of time, the controller 201 proceeds with data transmission. Whether or not the busy state is canceled can be detected by a message from the printer. If the printer is still busy even after the predetermined period of time has elapsed, the controller 201 ends the print process routine (step S113). The predetermined period of time can be determined depending on, e.g., the print speed of the printer and the size of the memory that stores image data. That is, data transmission to the printer can be paused within a period of time in which the printer does not encounter any under run error of data to be printed. That is, input of print data can be paused as long as the printer does not encounter any under run error. In other words, the controller pauses data transmission and makes the printer proceed with printing until a data under run error occurs.

The controller 201 checks if a print cancel command is input at the console 215 before the data under run time is reached (S313). If such command is input, the controller 201 ends the print process routine (S113)

Finally, the controller 201 checks if image data transfer is complete (S314). If image data transfer is not complete, the flow returns to step S310 to repeat a series of processes. Upon completion of image data transfer, the controller 201 ends the print process routine (S113).

<Operation of Image Forming Apparatus (Printer)>

Figure 8:
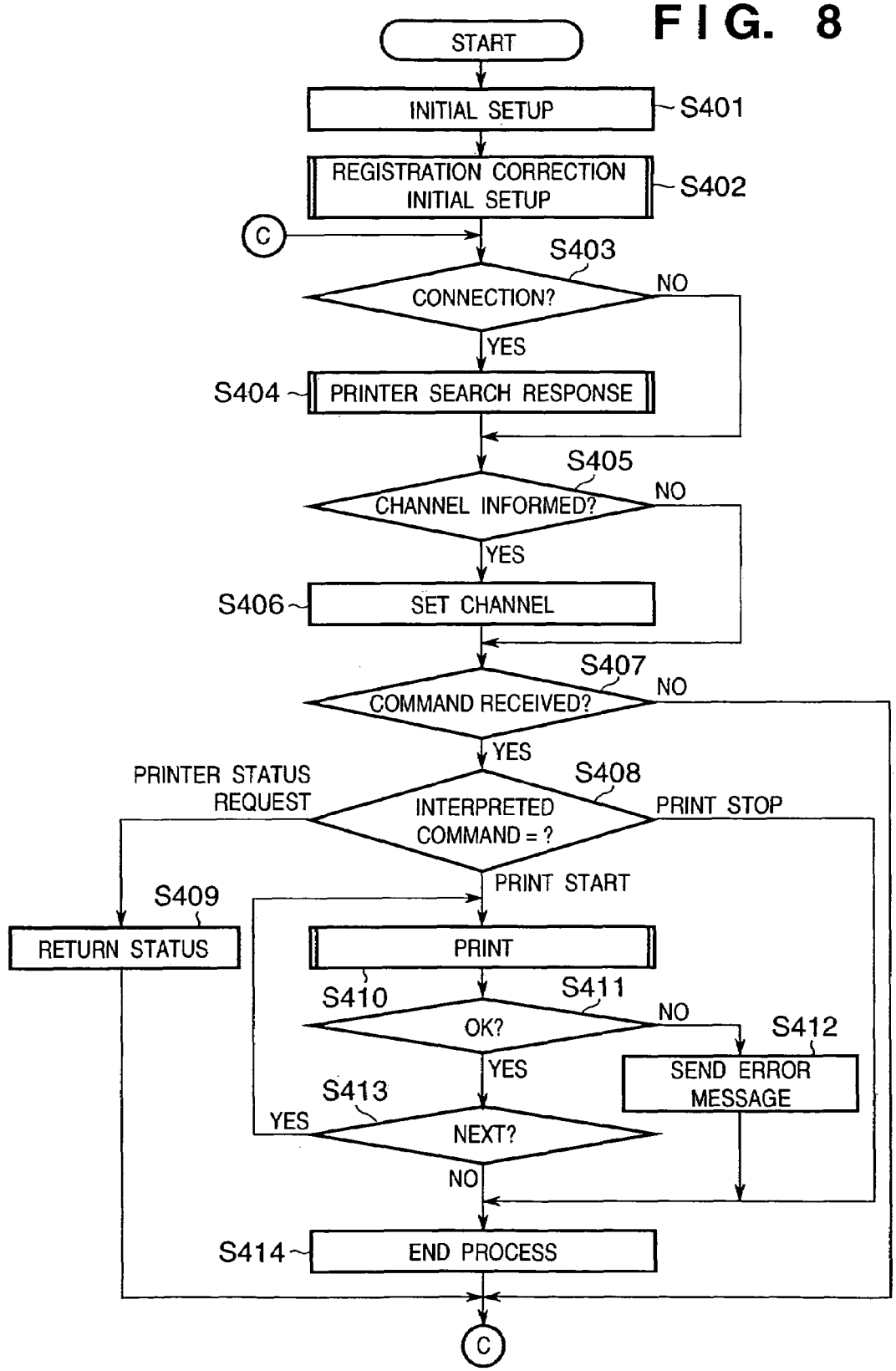
FIG. 8 is a flow chart showing the main routine of the image forming apparatus.

FIG. 8 is a flow chart showing the main routine of the image forming apparatuses 102 and 103.

When the power supply of the image forming apparatus 102 is turned on, the controller 301 initializes flags, registers, control variables, and the like, executes a control program such as an operating system stored in a given area of the first memory 302, and initializes the individual units of the image forming apparatus 102 (S401). Also, the controller 301 makes setups for correcting the position of a paper sheet to be fed, i.e., registration correction initial setups (S402).

The controller 301 checks if a new apparatus as well as the image forming apparatus 102 itself is connected to the high-speed serial communication lines 104, 105, 106, and 107 (S403). If such apparatus is detected, the controller 301 executes a printer search response process (S404). The printer search response process (S404) will be described in detail later using FIG. 9.

If no new apparatus is detected in step S403, the flow jumps to step S405.

The controller 301 checks in step S404 if it receives a number or numbers that identify one or a plurality of channels used in Iso transfer mode, which have been acquired by the computer 101, from the computer 101 via the high-speed serial communication line 105 using Async transfer mode. If the controller 301 receives a number or numbers that identify one or a plurality of channels, it saves the received number or numbers in a given area of the first memory 302, and makes predetermined setups required for receiving image data using Iso transfer mode (S406). If the controller 301 does not receive any channel identification number, the flow jumps to step S407.

The controller 301 checks in step S407 if it receives a command from the computer 101 via the high-speed serial communication line 105 using Async transfer mode. If a command is received, the controller 301 interprets the received command, and the flow branches in correspondence with the command contents (S408).

If the received command is a printer status request command, the controller 301 sends status to the computer 101 using Async transfer mode (S409), and the flow returns to step S402.

If the received command is a print start command, the controller 301 executes a print process (S410). The print process (S410) will be explained in detail later using FIG. 10. If the controller 301 finds any problem in the print process in step S410 (S411-NO), it sends error status to the computer 101 using Async transfer mode (S412), and executes a predetermined end process required in the image forming apparatus 102 (S414). After that, the flow returns to step S403.

If no problem is found in the print process in step S410, the controller 301 checks if it must successively execute the next print process (S413). If the next print process has already been queued, the flow returns to step S410 to repeat a series of operations. If no next print process need be executed, the controller 301 executes a predetermined end process required in the image forming apparatus 102 (S414), and the flow then returns to step S402.

Figure 9:
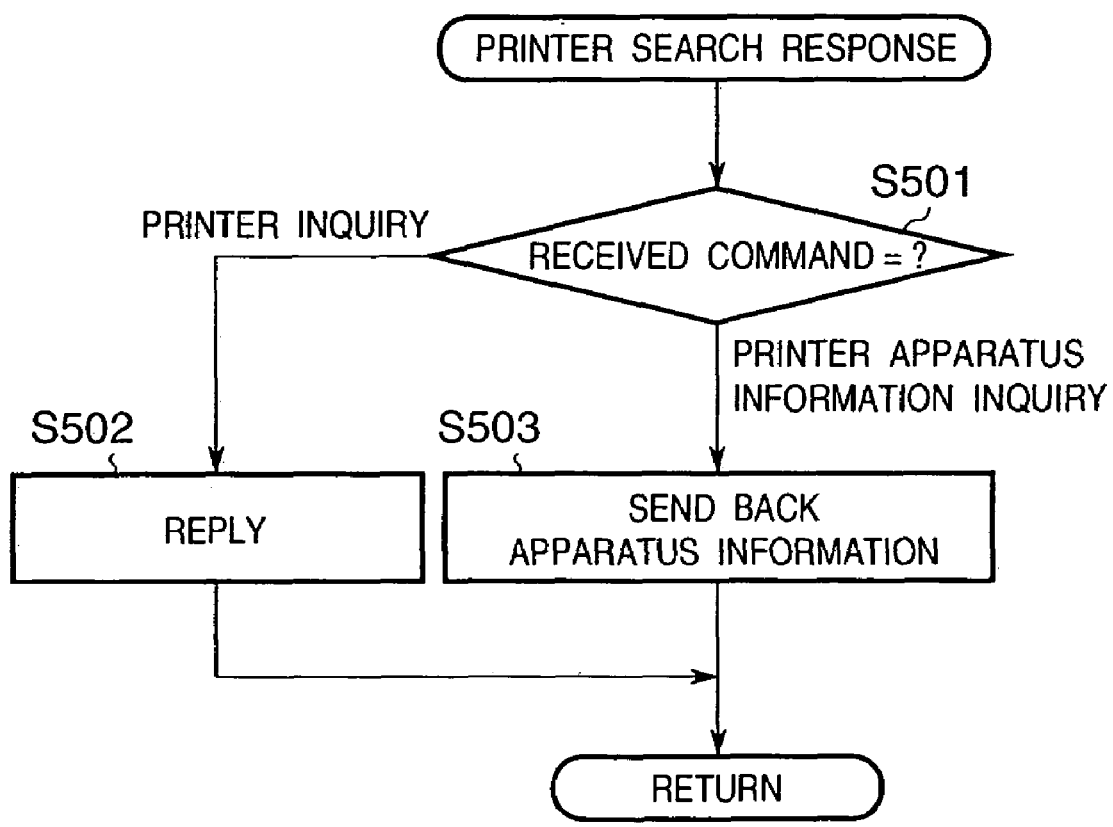
FIG. 9 is a flow chart showing the printer search response routine of the image forming apparatus.

FIG. 9 is a flow chart showing the printer search response process in step S404 in FIG. 8 in detail.

Upon receiving a command from the computer 101 via one or both of the high-speed serial communication lines 105 and 106 using Async transfer mode, the controller 301 or 401 interprets the received command and checks if the received command is a printer inquiry command that inquires of the controller 301 or 401 as to a printer such as an image forming apparatus or the like capable of printing image data transferred from the computer 101 (S501). If the printer inquiry command is received, the controller 301 or 401 sends back an OK reply to the computer 101 using Async transfer mode (S502) and ends the printer search response process routine (S403).

On the other hand, if the received command is a printer apparatus information inquiry command (S501), the controller 301 or 401 sends back printer apparatus information to the computer 101 using Async transfer mode (S503), and ends the printer search response process routine (S403).

Figure 10:
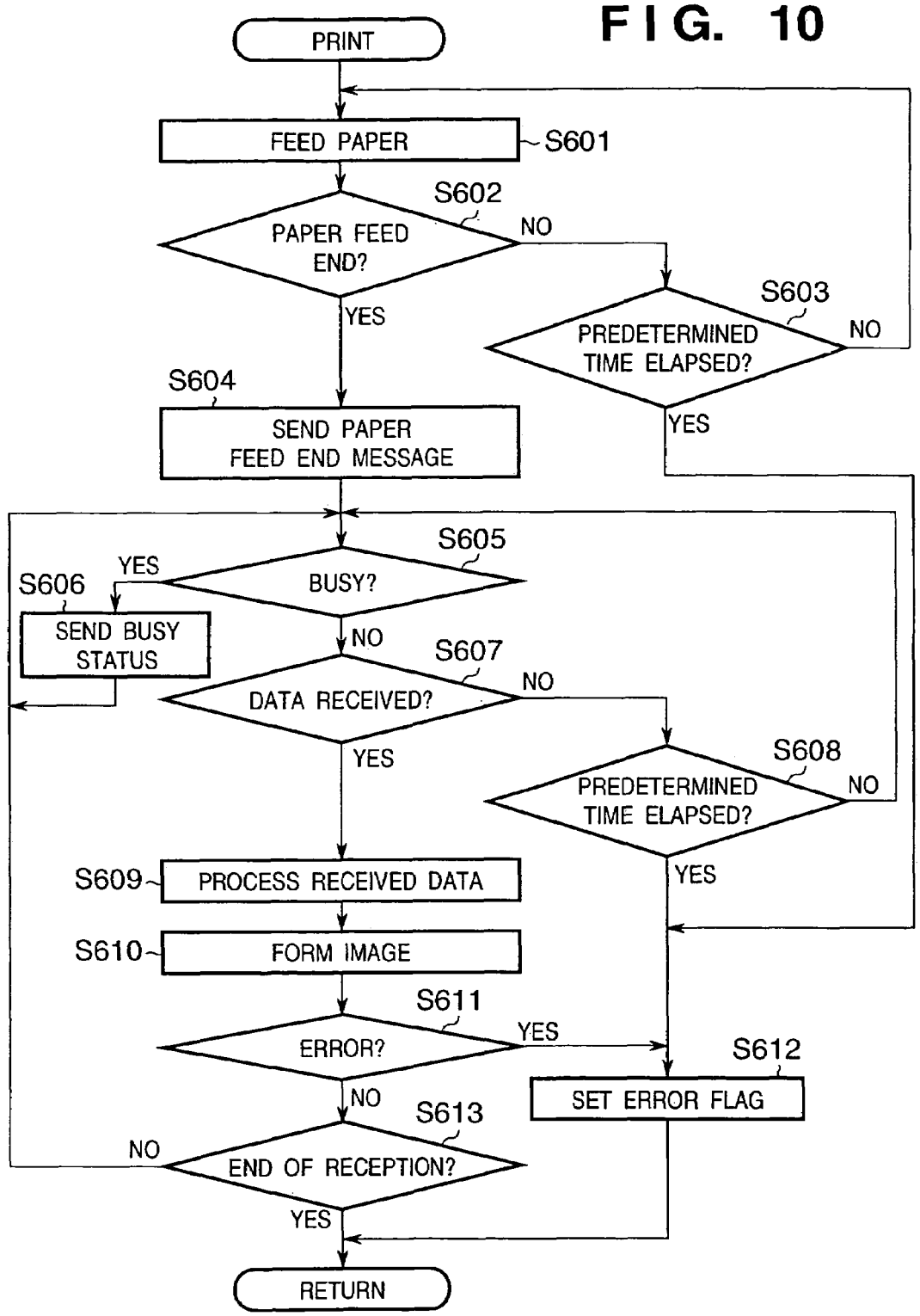
FIG. 10 is a flow chart showing the print routine of the image forming apparatus.

FIG. 10 is a flow chart showing the print process in step S409 in FIG. 8 in detail.

The controller 301 executes a paper feed process for picking up and feeding a recording sheet from one of the paper cassettes 41 and 42 so as to convey the recording sheet to the transfer sections 33, 34, 35, and 36 of the image forming apparatus 102 in turn (S601).

The leading edge of the fed recording sheet is registered by registration rollers located before the first transfer unit 33. At this time, a paper detector detects end of paper feed, and informs the controller 301 of it.

The controller 301 checks if paper feed is completed within a predetermined period of time (steps S602 and S603). If paper feed is completed within the predetermined period of time, the controller 301 sends a paper feed end message to the computer 101 via the high-speed serial communication line 105 using Async transfer mode (S604).

If end of paper feed is not detected within the predetermined period of time, the controller 301 sets an error flag (S612), and ends the print process routine (S409).

After the paper feed end message is output, the controller 301 checks if the apparatus is busy, i.e., is not ready to receive data (S605). If the apparatus is busy, the controller 301 sends busy status to the computer 101 using Async transfer mode (S606), and the flow returns to step S605.

If the apparatus is not busy, and if it has already sent busy status in step S606, the flow advances to step S607 after the controller 301 informs the computer of ready status. The controller 301 then checks if it begins to receive image data from the computer 101 in Iso transfer mode (step S607). If the controller 301 begins to receive image data, it starts reception of image data by the high-speed serial communication unit 308. If the controller 301 does not receive any data, it checks in step S608 if a predetermined period of time has elapsed. If the predetermined period of time has elapsed without receiving any data, the controller 301 quits a reception standby state, and sets an error flag in step S612.

Image data is received using one or a plurality of channels acquired by the computer 101 via the high-speed serial communication line 105 (106), high-speed serial communication connector 309, and high-speed serial communication unit 308 so as to implement data transfer with the guaranteed data transfer cycle.

As described above, prior to the beginning of data reception, the controller 301 receives a number or numbers that identify one or a plurality of channels from the computer 101 in step S404, and makes predetermined setups required for data reception in Iso transfer mode in step S405.

The controller 301 sends the received image data from the high-speed serial communication unit 308 to the image processing units 331, 332, 333, and 334, and the image processing units execute predetermined image processes of the received image data (S609).

The controller 301 sends the image data that have undergone the image processes from the image processing units 331, 332, 333, and 334 to the image forming units 341, 342, 343, and 344 to form images (S610).

The controller 301 checks if any problem such as paper jam has occurred upon image formation (S611). If any problem has occurred, the controller 301 sets an error flag (S612), and ends the print process routine (S409).

If no error occurs, the controller 301 checks if it is to proceed with reception of image data (S613). If the controller 301 is to proceed with reception of image data, the flow returns to step S605 to repeat a series of processes. Upon completion of reception of the image data, the controller 301 ends the print process routine (S409).

Figure 11:
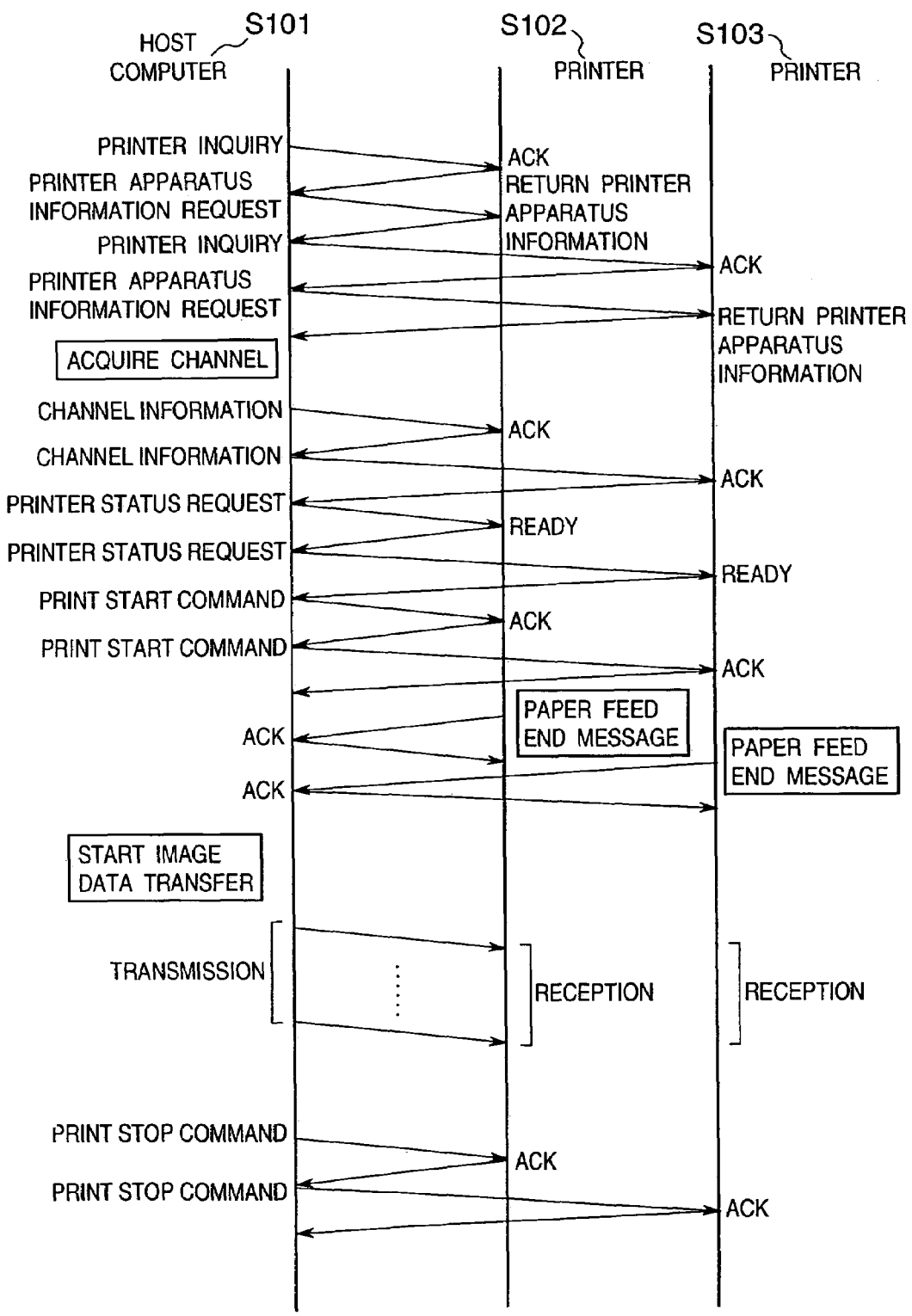
FIG. 11 is an explanatory view showing the flow of commands exchanged between the computer and image forming apparatus.

FIG. 11 is an explanatory view showing the flow of commands exchanged between the computer 101 and the image forming apparatuses 102 and 103 in the first embodiment. Since FIG. 11 explains exchange of commands in the explanations given using FIGS. 5 to 10, a detailed description thereof will be omitted.

As described above, when the computer makes a plurality of printers print an identical image, if one printer stops printing, the computer quits transmission of print data to all the printers. For this reason, even when the printers used do not have any memories for storing received data, which cannot be output, identical data can be set to a plurality of printers by isochronous transfer to make them print an image.

In the description of the above embodiment, the computer 101 and image forming apparatuses 102 and 103 are connected one each to the high-speed serial communication lines 104, 105, 106, and 107. However, one or a plurality of computers and image forming apparatuses may be combined.

Especially, three or more image forming apparatuses may be connected to the computer 101 to simultaneously print an image.

Also, one or a plurality of apparatuses other than the computer 101 and image forming apparatuses 102 and 103 may be connected to a high-speed serial communication I/F.

In the description of the embodiment, the computer 101 transfers image data to the image forming apparatuses 102 and 103. Alternatively, the computer may temporarily transfer image data to a server, which may simultaneously transfer image data to a plurality of image forming apparatuses.

After the computer transfers an image formation command to a server, the server may simultaneously transfer image data to a plurality of image forming apparatuses.

In these cases, a series of processes explained in the embodiment of the present invention, which are implemented between the computer and the plurality of image forming apparatuses, may be implemented between the server and the plurality of image forming apparatuses.

When the image forming apparatuses include an apparatus that forms an image by electrophotography, if image data transmission is paused in the middle of one page, and that pause time has exceeded a predetermined period of time, that page cannot be normally printed. For this reason, the image forming apparatus may comprise a memory having a size capable of storing image data for one page. In this case, upon receiving an output stop alert message from the image forming apparatus, the image processing apparatus pauses data transmission at the end of one page of image data. In this manner, although a memory for one page is required, printing can be paused without wasting a page which is being printed.

Other Embodiments

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program shown in FIGS. 5 to 7 that can implement the functions of the above-mentioned embodiments to a computer system, supplying a storage medium, a storage medium, which records a program code of a software program shown in FIGS. 8 to 10 to a printer, and reading out and executing the program code stored in the storage medium by a computer (or a CPU or MPU) of that computer system or printer.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

<Effect of Invention>

To restate, according to the present invention, when a single computer transfers image data to a plurality of image forming apparatuses via an isochronous communication, and makes them form images, the computer begins to send data after it confirms that all the image forming apparatuses are ready to receive data from the computer and to output received data. For this reason, each image forming apparatus can immediately output the received data and need not have any memory for temporarily saving the received data.

If a certain image forming apparatus must pause reception, the computer pauses data transmission until that apparatus restarts reception. In this manner, each image forming apparatus need not have any memory for storing data sent from the computer while it must pause reception.

As many apparently widely different embodiments of the present invention can be made without departing from the spirit and scope thereof, it is to be understood that the invention is not limited to the specific embodiments thereof except as defined in the appended claims.

What is claimed is:

1. An image forming system comprising an image processing apparatus and a plurality of image forming apparatuses, wherein
said image processing apparatus includes a data sending unit that sends print data to said plurality of image forming apparatuses using an isochronous mode,
each image forming apparatus of said plurality of image forming apparatuses includes an output unit that outputs an image based on the print data sent from said image processing apparatus and an informing unit that informs said image processing apparatus of a state in which said image forming apparatus cannot receive data from said image processing apparatus, and
said image processing apparatus further includes an instruction unit that, if said image processing apparatus is informed of the state by one of said plurality of image forming apparatuses and the state is not cancelled within a predetermined period of time, instructs the other of said plurality of image forming apparatuses to suspend output of the image based on the print data,
wherein, if said image processing apparatus is informed of the state by one of said plurality of image forming apparatuses and the state is cancelled within the predetermined period of time, said instruction unit dose not instructs the other of said plurality of image forming apparatuses to suspend output of the image based on the print data.

2. An image forming system according to claim 1, wherein said image processing apparatus further includes a checking unit that, if said image processing apparatus is informed of the state by one of said plurality of image forming apparatuses, checks whether the state is cancelled within the predetermined period of time.

3. An image forming system according to claim 1, wherein when said data sending unit suspends transmission of print data, said instruction unit instructs the other of the plurality of image forming apparatuses to suspend output.

4. An image forming system according to claim 1, wherein said instruction unit instructs the other of the plurality of image forming apparatuses to suspend output, using an asynchronous mode.

5. A image forming system according to claim 1, wherein said informing unit informs said image processing apparatus of the state using an asynchronous mode.

6. A method of controlling an image forming system that includes an image processing apparatus and a plurality of image forming apparatuses, said method comprising:
a data transfer step of transferring print data to the plurality of image forming apparatus from the image processing apparatus using an isochronous mode;
an output step of outputting an image based on the print data transferred from the image processing apparatus to each of the plurality of image forming apparatuses;
a state informing step of transferring information on a state in which at least one of the plurality of image forming apparatuses cannot receive data from the image processing apparatus, from the at least one of the plurality of image forming apparatuses to the image processing apparatus; and
an instruction step of, if the information on the state is transmitted from one of the plurality of image forming apparatuses to the image processing apparatus and the state is not cancelled within a predetermined period of time, transferring an instruction from the image processing apparatus to the other of the plurality of image forming apparatuses instructing the other of the plurality of image forming apparatuses to suspend output of an image,
wherein, if the information on the state is transmitted from one of the plurality of image forming apparatuses to the image processing apparatus and the state is cancelled within the predetermined period of time, the instruction is not transferred from the image processing apparatus to the other of the plurality of image forming apparatuses.

7. A method according to claim 6, further comprising:
a checking step of, if the information on the state is transmitted from one of the plurality of image forming apparatuses to the image processing apparatus, checking whether the state is cancelled within the predetermined period of time.

8. A method according to claim 6, wherein when transmission of print data is suspended, said instruction step instructs the other of the plurality of image forming apparatuses to suspend output.

9. A method according to claim 6, wherein said instruction step instructs each of the plurality of image forming apparatuses to suspend output, using an asynchronous mode.

10. A method according to claim 6, wherein said state informing step transfers the information on the state from the at least one of the plurality of image forming apparatuses to the image processing apparatus using an asynchronous mode.

* * * * *

UNITED STATES PATENT AND TRADEMARK OFFICE
CERTIFICATE OF CORRECTION

| | | |
|---|---|---|
| PATENT NO. | : 7,268,908 B2 | Page 1 of 2 |
| APPLICATION NO. | : 10/923878 | |
| DATED | : September 11, 2007 | |
| INVENTOR(S) | : Yoichi Yamagishi | |

It is certified that error appears in the above-identified patent and that said Letters Patent is hereby corrected as shown below:

IN THE DRAWINGS:
Sheet No. 5, Figure 5, the horizontal line between S112 and S113 should not have a gap in it.

COLUMN 2:
Line 56, "image-forming" should read --image forming--.

COLUMN 5:
Line 54, "connected," should read --connection,--.

COLUMN 9:
Line 30, ".33" should read --33--.
Line 61, "The" should begin a new paragraph.

COLUMN 10:
Line 9, "(S1O1)" should read --(S101)--.
Line 31, "213" should read --214--.
Line 49, "213" should read --214--.

COLUMN 12:
Line 31, "apparatus." should read --apparatus--.

COLUMN 13:
Line 17, "(S113)" should read --(S113).--.

COLUMN 17:
Line 42, "dose" should read --does--.
Line 43, "instructs" should read --instruct--.

UNITED STATES PATENT AND TRADEMARK OFFICE
CERTIFICATE OF CORRECTION

PATENT NO. : 7,268,908 B2
APPLICATION NO. : 10/923878
DATED : September 11, 2007
INVENTOR(S) : Yoichi Yamagishi It is certified that error appears in the above-identified patent and that said Letters Patent is hereby corrected as shown below:

COLUMN 18:
Line 3, "A" should read --An--.
Line 10, "forming apparatus" should read --forming apparatuses--.

Signed and Sealed this

Twentieth Day of May, 2008

JON W. DUDAS
*Director of the United States Patent and Trademark Office*